United States Patent [19]

Kato et al.

[11] Patent Number: 4,518,726

[45] Date of Patent: May 21, 1985

[54] METALLIC BASE PAINT

[75] Inventors: Yasushi Kato; Hisao Furukawa, both of Kobe, Japan

[73] Assignee: Kanegafuchi Kagaku Kogyo Kabushiki Kaisha, Osaka, Japan

[21] Appl. No.: 365,937

[22] Filed: Apr. 5, 1982

[30] Foreign Application Priority Data

Apr. 27, 1981 [JP] Japan .................................. 56-64780

[51] Int. Cl.$^3$ .......................... C09D 3/12; C09D 3/82; C08L 83/06
[52] U.S. Cl. ......................................... 524/32; 524/40; 524/264; 524/266; 524/447; 525/100; 525/342; 427/199
[58] Field of Search .................... 524/32, 40, 439, 441, 524/266, 264; 427/192, 199, 205; 525/342, 100

[56] References Cited

U.S. PATENT DOCUMENTS

| | | | |
|---|---|---|---|
| 2,698,314 | 12/1954 | Rust | 524/39 |
| 3,941,731 | 3/1976 | Camelon et al. | 524/37 |
| 4,139,519 | 2/1979 | Itoh et al. | 524/530 |
| 4,157,321 | 6/1979 | Kawakami et al. | 524/266 |
| 4,191,713 | 3/1980 | Yonezawa et al. | 528/272 |
| 4,368,297 | 1/1983 | Kato et al. | 525/100 |
| 4,371,664 | 2/1983 | Kato et al. | 525/100 |
| 4,427,824 | 1/1984 | Kato et al. | 544/858 |

*Primary Examiner*—John Kignt
*Assistant Examiner*—Nathan M. Nutter
*Attorney, Agent, or Firm*—Moonray Kojima

[57] ABSTRACT

A metallic base paint comprising a blend consisting essentially of (A) a silyl group containing vinyl type resin having a backbone substantially comprising a polyvinyl type polymer chain and containing at least one silicon atom attached to a hydrolyzable group at a terminal or in a side chain in its molecule; (B) metal powder; and one or more of the following: (C) acrylic resin; (D) cellulosic compound; (E) reactive silicon compound. This paint can be cured at low temperatures, with setting time, and provides a coated surface of uniform metallic luster.

11 Claims, No Drawings

METALLIC BASE PAINT

BACKGROUND OF THE INVENTION

1. Field of the Invention

This invention relates to a metallic base paint, and more particularly, to a composition, useful as a metallic base paint, and containing a silyl group containing vinyl type resin containing at least one silicon atom attached to a hydrolyzable group at a terminal or in a side chain of its molecule.

2. Description of the Prior Art

The present inventors have previously discovered that vinyl type resins containing at least one silicon atom attached to a hydrolyzable group at the terminal or in a side chain in the molecule have, in addition to excellent characteristics inherent to vinyl type resins, e.g. higher luster, weather resistance, discoloration resistance, improved adhesion to inorganic substances due to the hydrolyzable silyl group, etc. Moreover, such resins can form minute networks by crosslinking at ambient temperature upon exposure to moisture, especially ambient atmospheric moisture. Thus, the resins have excellent solvent resistance, water resistance, heat resistance, high hardness, weather resistance, etc.

Generally, a metallic luster coating is achieved by coating a metallic base paint containing a metal powder, e.g. an aluminum powder, etc, and either while it is wet or after it has been dried coating thereon a topcoat transparent paint, and drying. Recently, however, to meet strong demand for speeding up the coating step, it is more frequently now the practice to coat the base paint and thereafter coat a topcoat, after only a brief interval of time. Such a practice, however, is accompanied by a problem. After the topcoat has been applied to the coated metallic base paint, the metal powder distributed in the paint is often swept away, or the resin in the base paint is often dissolved by the coating of the topcoat, to sweep away the metal powder. Thus, disadvantageously, the metallic luster is rendered non-uniform. In order to solve such a problem, various measures have been used, such as use of a high molecular weight resin, use of a highly volatile solvent, etc. However, these prior art solutions are restricted and deficient in the choice of kinds of resin and solvent or diluent.

Accordingly, there exists in the art, a need for a metallic base paint which does not have the aforementioned deficiencies and disadvantages.

SUMMARY OF THE INVENTION

An object of the invention is to overcome the aforementioned and other deficiencies and disadvantages of the prior art.

Another object is to provide a metallic base paint which substantially reduces the time between its application and the application of a topcoat, and eliminate the deficiencies and disadvantageous of the prior art.

As a result of intensive study, the present inventors have discovered a composition for a metallic base paint which has successfully reduced the time interval between the coating of the metallic base paint and the coating of a topcoat transparent paint (hereinafter referred to as the setting time). The inventive composition, advantageously, has good workability and further after curing provides a coated surface which has uniform metallic luster.

The foregoing and other objects and features of the invention are attained by this invention which encompasses a metallic base paint comprising (A) a silyl group containing vinyl type resin having abackbone substantially comprising a polyvinyl type polymer chain and containing at least one silicon atom attached to a hydrolyzable group at the terminal or in a side chain in its molecule; and (B) metallic powder; and one or more of the following: (C) acrylic resin; (D) cellulosic compound; and (E) reactive silicon compound. The paint may also include a curing accelerator.

DETAILED DESCRIPTION OF PREFERRED EMBODIMENTS

The resin used in this invention has a backbone which substantially comprises a vinyl type polymer chain and contains at least one, and preferably 2 or more, silyl groups attached to hydrolyzable groups at the terminals or in side chains in its molecules. Most of the silyl groups used herein are represented the formula:

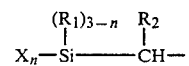

wherein X is a hydrolyzable group, $R_1$ and $R_2$ are each hydrogen or any alkyl group, aryl group or aralkyl group having 1 to 10 carbon atoms, and n is an integer of 1,2 or 3.

Examples of the hydrolyzable group include halogen, alkoxy, acyloxy, ketoxymate, amino, acid amido, aminoxy, mercapto, alkenyloxy groups, and the like.

Production of the silyl group containing vinyl type resin according to the invention, may be effected in various ways. For example, one process, herein called process(i), involves hydrosilylation reaction using a vinyl type resin having a carbon-carbon double bond and a hydrosilane. Another process (called process(ii)) involves a copolymerization of a vinyl type compound and a silyl compound having a polymerizable double bond. These processes are advantageous from an industrial standpoint, and will be described in further detail below:

Process (i)

The silyl group containing vinyl type resin of this invention may be easily produced by reaction of a hydrosilane compound with a vinyl type resin having a carbon-carbon double bond, in the presence of a catalyst of a Group VIII transition metal. The hydrosilane compound used in this invention has the following general formula:

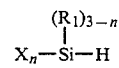

wherein $R_1$ is hydrogen, or a monovalent hydrocarbon group selected from the group consisting of an alkyl group, an aryl group and an aralkyl group having 1 to 10 carbon atoms; X is a hydrolyzable group and n is an integer of 1, 2, or 3.

Specific examples of hydrosilane compounds within this general formula include halogenated silanes, such as, methyldichlorosilane, trichlorosilane, phenyldichlorosilane, etc; alkoxysilanes, such as, methyldiethoxysilane, methyldimethoxysilane, phenyldimethoxysilane, trimethoxysilane, triethyoxysilane, etc; acyloxysilanes, such as, methyldiacetoxysilane, phenyldiacetoxysilane, triacetoxysilane, etc; and other various silanes, such as methyldiaminoxysilane, triaminoxysilane, methyldiaminosilane, triaminosilane, bis(dimethylketoxymate)methylsilane, bis(cyclohexylketoxymate)methylsilane, methyldiisopropenoxysilane, triisopropenoxysilane, etc.

The amount of hydrosilane compound used, can be any suitable amount, but, is preferably from 0.5 to 2 moles per carbon-carbon double bond, contained in the vinyl type resin. Although use of hydrosilane compound in an amount above this range is not excluded, no substantial benefit is obtained thereby. The added amount will usually remain unreacted and may be recovered for reuse.

Furthermore, a highly reactive halogenated silane, which is an inexpensive basic starting material, may easily be employed as the hydrosilane compound used in this invention. The silyl group containing vinyl type resin, obtained by using a halogenated silane, when exposed to moisture in the ambient atmosphere, rapidly cures at the ambient temperature, and, disadvantageously, emits hydrogen chloride. This results in such problems as generation of pungent odor, due to the hydrogen chloride, and corrosion of substances in contact with the resin or adjacent to the resin. Hence, this resin can only be employed in a limited number of practical applications. Thus, it is desirable to subsequently further convert the halogen function group to other hydrolyzable functional groups. For example, it may be converted to alkoxy, acryloxy, aminoxy, amido, acid amido, ketoxymate, mercapto and the like groups. One method of such conversion is disclosed, for example, in Japanese Laid-Open Patent Application No. 91546/1979 which corresponds to U.S. Pat. No. 4,191,713.

The vinyl type resin used in process (i), in this invention is not particularly limited, except that the vinyl type resin containing hydroxyl groups are excluded. A resin comprising, as the main component, a homopolymer or a copolymer selected from the following is suitable: acrylic acid or methacrylic acid esters, such as, methyl acrylate, methyl methacrylate, ethyl acrylate, ethyl methacrylate, butyl acrylate, butyl methacrylate, 2-ethylhexyl acrylate, 2-ethylhexyl methacrylate, etc; carboxylic acids, such as, acrylic acid, methacrylic acid, itaconic acid fumaric acid, etc; acid anhydrides, such as, maleic anhydride, etc; epoxy compounds, such as, glycidyl acrylate, glycidyl methacrylate, etc; amino compounds, such as, diethylaminoethyl acrylate, diethylaminoethyl methacrylate, aminoethyl vinyl ether, etc; amide compounds, such as, acrylamide, methacrylamide, itaconic acid diamide, alpha ethylacrylamide, crotonamide, fumaric acid diamide, maleic acid diamide, N-butoxymethylacrylamide, N-butoxymethylmethacrylamide, etc; acrylontrile; iminol methacrylate; styrene; alpha methylstyrene; vinyl chloride; vinyl acetate; vinyl propionate; etc. On producing a homopolymer or copolymer of these vinyl compounds, allyl acrylate, allyl methacrylate, diallyl phthalate or the like, may be partially radical copolymerized therewith to incorporate a carbon-carbon double bond into the vinyl type resin at the molecular terminal or in a side chain of the molecule, for the hydrosilyation reaction. The amount of monomer necessary for this can be determined depending on the number of silyl groups in the desired resin. Furthermore, the molecular weight may be modified by adding a chain transfer agent, such as n-dodecylmercaptan, t-dodecylmercaptan, etc. Polymerization of these vinyl compounds may be conducted either using or not using a solvent. If a solvent is used, a non-reactive solvent is preferred, such as an ether, hydrocarbon, acetic acid ester, etc.

In this invention, a catalyst of a transition metal complex is used in the stage of reacting the hydrosilane compound with the carbon-carbon double bond. Effectively employed as the transition metal complex catalyst, is a complex of a Group VIII transition metal selected from platinum, rhodium, cobalt, palladium and nickel. This hydrosilyation reaction may be effected at any temperature of from 50° C. to 150° C., and the reaction time may be about from 1 to 10 hours.

Process (ii)

The other process used in the invention, comprises radical polymerization of various vinyl type compounds with silane compound of the formula:

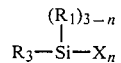

wherein $R_1$ is a monovalent hydrocarbon group selected from an alkyl group, an aryl group and an aralkyl group having 1 to 10 carbon atoms, $R_3$ is an organic residue containing a polymerizable double bond, X is a hydrolyzable group, and n is an integer 1, 2 or 3.

Examples of the silane compounds used in this invention include:

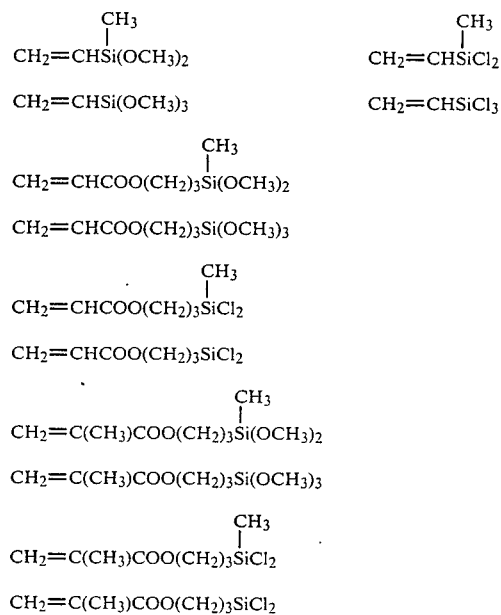

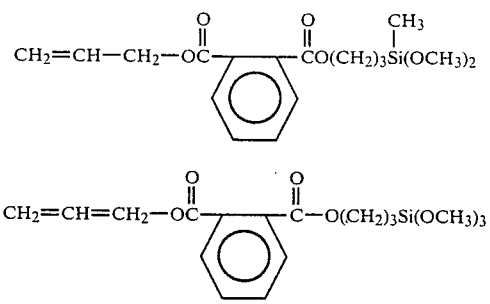

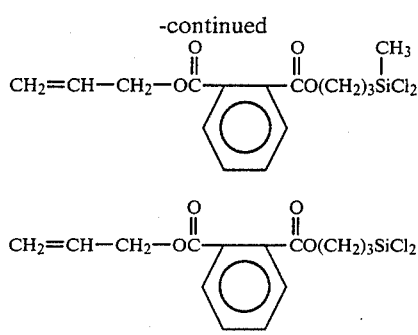

These silane compounds may be synthesized in various manners. For example, they may be produced by reacting acetylene, allyl acrylate, allyl methacrylate or diallyl phthalate with methyldimethoxysilane, methyldichlorosilane, trimethoxysilane or trichlorosilane, in the presence of a catalyst of a Group VIII transition metal.

While the compounds used for the synthesis of the vinyl type resin in the above process (i) may be used as a vinyl type compound used in process (ii), there may also be employed vinyl type compounds containing a hydroxyl group, such as, 2-hydroxyethyl acrylate, 2-hydroxyethyl methacrylate, 2-hydroxypropyl acrylate, 2-hydroxypropyl methacrylate, 2-hydroxyvinyl ether, N-methylol acrylamide, ARONIX 5700 (produced by Toa Gosei Chemical Company, Inc.), and the like.

The synthesis of a copolymer of such vinyl type compounds and silane compounds may be carried out by a conventional solution polymerization method. The vinyl type compound, the silane compound, a radical initiator, and a chain transfer agent, such as n-dodecylmercaptan, t-dodecylmercaptan, and the like, selected according to the molecular weight desired in the produced silyl group containing resin, are added and reacted at a temperature of from 50° C. to 150° C. A solvent may be optionally used. If a solvent is used, a non-reactive solvent is preferred, such as for example, an ether, a hydrocarbon, an acetic acid ester, and the like.

The silyl group containing vinyl type resin, thus obtained, may be subjected to, for example, a method for displacing the hydrolyzable group, such as disclosed in Japanese Laid-Open Patent Application No. 91546/1979 which corresponds to U.S. Pat. No. 4,191,713.

Thus, there is obtained a silyl group containing vinyl type resin in which the backbone substantially comprises a vinyl type polymer chain and contains at least one silicon atom attached to a hydrolyzable group at a terminal or in a side chain of its molecule.

As the metallic powder (B) used in this invention, aluminum powder, zinc powder, and other metallic powders conventionally employed in metallic base paints are employed either alone or as a mixture of two or more.

The acrylic resin (C) used in this invention is not particularly restricted. There may be employed, for example, acryl resins such as ALOMATEX and OLESTER (produced by Mitsui Toatsu Chemical Company, Ltd) COATAX (produced by Toray Industries, Ltd) ACRIC (produced by Kansai Paint Company, Ltd), NIPPE ACRYL (produced by Nippon Paint Company, Ltd), homopolymers of acrylic acid esters or methacrylic acid esters and copolymers of each of those, with other vinyl monomers; as well as straight acryl lacquers, modified acryl lacquers, and the like. Furthermore, it is also possible to use an acrylic resin obtained by copolymerizing vinyl type compounds in the presence of a cellulosic compound.

As the cellulosic compound (D) used in this invention, there may be employed nitrocellulose, acrylcellulose, cellulose acetate butylate, cellulose acetate propionate, ethylcellulose, benzylcellulose and the like.

As the reactive silicon compound (E) used in this invention, there may be employed, for example, silane coupling agents, such as A-143, A-151, A-172, A-174, A-186, A-187, A-189, A-1100, A-1120, A-1160 (produced by Nippon Unicar Co. Ltd), silicon type primers such as AP-133, AP-3109, Y-5106, Y-5252 (produced by Nippon Unicar Co, Ltd); amines containing at least one silicon atom attached to a hydrolyzable group in the molecule; reaction products of a silane coupling agent containing an amino group such as A-1100, A-1120 (produced by Nippon Unicar Co, Ltd) with a silane coupling agent containing an epoxy group such as the aforementioned A-185, A-187; reaction products of the above-described silane coupling agent containing an amino group with a compound containing an epoxy group such as ethylene oxide, butylene oxide, epichlorohydrin, epoxylated soybean oil, and Epicoat 828, Epicoat 1001 (produced by Shell Co.); reaction products of the above described silane coupling agents containing an epoxy group with an amine, for example, aliphatic amines, such as ethylamine, diethylamine, triethylamine, ethylenediamine, hexanediamine, diethylenetriamine, triethylenetetramine, tetraethylenepentamine, etc; aromatic amines, such as, aniline, diphenylamine, etc; alicyclic amines, such as, cyclopentylamine, cyclohexylamine, etc; ethanolamines, etc; reaction products obtained by adding water, and, if necessary, an acidic or alkaline catalyst to the above described silane coupling agent containing an amino group and a compound containing a hydrolyzable silyl group, such as, ethyl silicate, ethyl silicate 40, methyltrimethoxysilane, methyltriethoxysilane, the above described A-151, A-172, A-174, A-186, A-187, A-1160, etc; and partially hydroyzing, and the like.

Although the compositional proportion of the respective components of the metallic base paint in this invention is not particularly restricted, preferred ranges are 0.5 to 100, more preferably 1 to 50, parts by weight of the metallic powder (B); 0.01 to 100, more preferably 0.1 to 80, parts by weight of the acrylic resin(C); 0.01 to 100, more preferably, 0.1 to 80, parts by weight of cellulosic compound (D); and 0.01 to 50, more preferably, 0.1 to 30, parts by weight of reactive silicon compound (E), based on 100 parts by weight of the silyl group containing vinyl resin (A). The resin (A) and metal powder (B) are homogeneously mixed together with one or more of the following: acrylic resin (C); cellulosic compound (D) and reactive silicon compound (E). Furthermore, the paint may contain conventional pigments, solvents, or diluents. Also, a curing agent may be used in the paint together with the mixture of resin (A) and Metallic powder (B), and the one or more of acrylic resin (C), cellulosic compound (D) and reactive silicon compound (E).

By mixing the above components (A) and (B) together with one or more of component (C), component (D) and component (E), and using the mixture as a metallic base paint, and after curing of same by exposure to ambient moisture, the resulting metallic coat has good coating workability, improved metallic evenness, and the other properties above discussed.

There is no particular restriction on the topcoat paint or clear coating, to be used when forming a metallic coat by first coating the inventive metallic paint on a suitable surface. For example, conventionally used lacquers, acryl lacquers, modified acyl lacquers, straight acryl, acryl melamines, alkyd melamines, two-pack type acryl urethane lacquers, two-pack type acryl urethanes, two pack type polyester urethanes, etc; and also resins having a hydrolyzable silyl group, as herein disclosed, may be used.

The metallic base paint of this invention forms a metallic base coating at ambient temperature or by heating. At that time, a curing accelerator may be optionally used. Where a curing accelerator is used, such accelerator may comprise, for example, carboxylic acid metal salts, such as alkyl titanic acid salts, tin octylate, dibutyltin dilaurate, lead octylate, etc; sulfide type and mercaptide type organic tin compounds, such as monobutyltin sulfide, dibutyltin dioctyl mercaptide, etc; acidic accelerators, such as p-toluenesulfonic acid, phthalic acid, etc; amines, such as, tetraethylenepentamine, triethylenediamine, N-$\beta$-aminoethyl-$\gamma$-aminopropyltrimethoxysilane, etc; alkaline accelerators, such as potassium hydroxide, sodium hydroxide; and the like. The amount of curing accelerator to be added, is preferably in the range of 0.001 to 10 percent by weight based on the solids of the silyl group containing vinyl resin. For example, using 100 parts by weight silyl group containing resin, the amount of accelerator to be used would be 0.001 to 10 parts by weight.

Since the metallic base paint of this invention readily cures at ambient temperature or low temperatures, and produces a resin having an excellent adhesion to suitable surfaces, it is particularly useful as a metallic base paint for surfaces of inorganic substances, such as, iron, tin, galvanized steel, aluminun, zinc steel, tiles, slates, etc; and for surfaces of organic substances, such as wood, paper, plastic, coats of organic paints, and the like. For example, the inventive paint may be used as a coating for the exterior surfaces of production line vehicles, as well as for paints used in repairing such vehicles.

This invention will now be more particularly described with references to the following actual examples, which examples are illustrative of the principles of the invention and are not to be construed to be limiting of the invention.

Preparation of the Silyl Group Containing Resin

EXAMPLE 1

A solution of 2 g of azobisisobutylonitrile in 30 g of styrene, 16 g of allyl methacrylate, 20 g of methyl methacrylate, 19 g of n-butyl methacrylate, 14 g of butyl acrylate, 4 g of maleic anhydride, and 1 g of n-dodecylmercaptan was added dropwise to 90 g of a xylene solvent heated to 90° C. The mixture was reacted for 10 hours to obtain a vinyl type copolymer containing allyl type unsaturated groups and having a molecular weight of 12,000. Any know method may be used to measure the molecular weight, such as the GPC method (gel permeation column). The infrared spectrum of this product showed an absorption of the carbon-carbon double bond at 1648 cm$^{-1}$ and an absorption of the acid anhydride at 1780 cm$^{-1}$. The resultant solution was distilled under reduced pressure to remove 40 g of the solvent.

To 16 g of the obtained solution of the vinyl copolymer containing allyl type unsaturated groups was added a solution of 1.5 g of methyldimethoxysilane and 0.0005 g of chloroplatinic acid in isopropanol, and the reaction was effected under sealed conditions at 90° C. for 6 hours. In the infrared spectrum of this resin, the absorption at 1648 cm$^{-1}$ was not found. Thus, a silyl group containing vinyl type polymer was obtained.

EXAMPLE 2

A solution of 1 g of azobisisobutylonitrile in 30 g of styrene, 22 g of $\gamma$-methacryloxypropyltrimethoxysilane, 22 g of methyl methacrylate, 15 g of n-butyl methacrylate, and 18 g of butyl acrylate, was added dropwise to 70 g of xylene, heated to 90° C. The mixture was reacted for 10 hours to obtain a silylgroup containing vinyl type resin having a molecular weight of 30,000.

EXAMPLE 3

A solution of 1 g of azobisisobutylonitrile in 30 g of styrene, 11 g of $\gamma$-methacryloxypropyltrimethoxysilane, 33 g of methyl methacrylate, 15 g of n-butyl methacrylate, 18 g of butyl acrylate, 4 g of acrylamide, 10 g of n-butanol, was added dropwise to 70 g of xylene heated to 120° C. The mixture was reacted for 10 hours to produce a silyl group containing vinyl type resin, having a molecular weight of 12,000.

EXAMPLE 4

A solution of 2 g of azobisisobutylonitrile in 22 g of $\gamma$-methacryloxypropyltrimethoxysilane, 52 g of methyl methacrylate, 13 g of n-butyl methacrylate, 18 g of butyl acrylate, 4 g of acrylamide, 10 g of n-butanol and 1 g of n-dodecylmercaptan, was added dropwise to 70 g of xylene, heated to 90° C. The mixture was reacted for 10 hours, to produce a silyl group containing vinyl type resin, having a molecular weight of 12,000.

Preparation of Metallic Base Paint

To each of the resin solutions obtained in Examples 1 through 4 describe above, there was added 40 parts by weight of aluminum paste (1109MA produced by Toyo Aluminum Company, Ltd) per 100 parts by weight of the resin solids, followed by acrylic resin, cellulosic compound, reactive silicon compound, and curing accelerator, in the amounts and in the particular component, as more fully set forth in Table 1. The mixture was homogeneously blended using an ordinary blender. The mixture was diluted with a solvent (butyl acetate/ethyl acetate=1 in the weight ratio) until the coating viscosity was 15 seconds with Ford Cup No. 4. The thusly obtained metallic base paint was spray coated on a soft steel plate. After two minutes as the setting time, the resin solution obtained in Example 2, and diluted with the same solvent as above described, to the same coating viscosity above described, was coated on the above metallic base paint coating. The soft steel plate having the base paint and the topcoat, was stood up against a stand, and the movement of the metal in the metallic base was examined to measure the setting time, at which the metal movement ceased. The results of measurement are shown in Table 1.

As shown in the Table, a great reduction of setting time is produced by adding to the mixture of silyl group containing resin and metal powders, one or more of the following: acrylic resin, cellulosic resin, and reactive silicon compound. The comparison is made where even an accelerator is used.

TABLE 1

| Silyl Group Containing Resin (A) 100 PBW*[1] | Acrylic Resin (C) (Parts by weight) | Cellulosic Compound (D) (Part by weight) | Reactive Silicon Compound (E) (Parts By Weight) | Curing Accelerator (parts by weight) | Setting time (minutes) |
|---|---|---|---|---|---|
| Ex. 1 | Kansai Paint ACRIC 200GL (15) | | | Dibutyltin dilaurate (3) | 10 |
| Ex. 2 (comp) | | | | Sankyo Organic Stann OM (3) | 60 |
| Ex. 2 | | Kodak CAB551.0.2 (20) | | Sankyo Organic Stann OM (3) | 10 |
| Ex. 2 | Nippon Paint NIPPE ACRYL (15) | | Nippon Unicar A-1120 (0.5) | Sankyo Organic Stann OM (3) | 10 |
| Ex. 3 | | | Nippon Unicar AP-133 (2) | Sankyo Organic Stan ONZ-22 (3) | 5 |
| Ex. 3 | Mitsui Toatsu ALOMATEX894-2 (10) | Daisel RS 1/2 (5) | Nippon Unicar A-1100 (0.5) | Sankyo Organic Stan ONZ-22 (3) | 5 |
| Ex. 4 | Mitsui Toatsu ALOMATEX L-1042 (10) | Kodak CAB551.0.2 (30) | | Sankyo Organic Stann ONJ-IF (8) | 10 |
| Ex. 4 | | Kodak CAB551.0.2 (3) | Nippon Unicar A-1100 (0.5) | Sankyo Organic Stann ONJ-IF (8) | 10 |

Notes:
*[1]based on solid content.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. An ambient temperature, moisture curable coating composition consisting essentially of a wet solution blend of (A) a silyl group containing vinyl type resin having a backbone substantially comprising a polyvinyl type polymer chain and containing at least one silicon atom attached to a hydrolyzable group at a terminal or in a side chain in its molecule; and (B) a metallic powder; and one or more of the following: (C) acrylic resin; (D) cellulosic compound; and (E) reactive silicon compound, wherein said metallic powder is suspended in said wet solution blend.

2. The paint of claim 1, wherein said metallic powder is aluminum.

3. The paint of claim 1, wherein said cellulosic compound is nitrocellulose.

4. The paint of claim 1, wherein said cellulosic compound is cellulose acetate butyrate.

5. The paint of claim 1, wherein said reactive silicon compound is a single silane coupling agent or a mixture of two or more silane coupling agents.

6. The paint of claim 1, wherein said reactive silicon compound is a silicon type primer.

7. The paint of claim 1, wherein said reactive silicon compound is a single amine compound containing at least one silicon atom attached to a hydrolyzable group in the molecule or a mixture of two or more such amine compounds.

8. The paint of claim 1, wherein said resin is used in an amount of 100 parts by weight; said metallic powder is used in an amount of from 0.5 to 100 parts by weight; said acrylic resin is usable in an amount of from 0.01 to 100 parts by weight; said cellulosic compound is usuable in an amount of from 0.01 to 100 parts by weight; and said reactive silicon compound is usable in an amount of from 0.01 to 50 parts by weight.

9. The paint of claim 8, wherein said metallic powder is used in an amount of from 1 to 50 parts by weight, said acrylic resin is usable in an amount of from 0.1 to 80 parts by weight; said cellulosic compound is usable in an amount of from 0.1 to 80 parts by weight; and said reactive silicon compound is usable in an amount of from 0.1 to 30 parts by weight.

10. An ambient temperature, moisture curable composition consisting essentially of 0.01 to 10 parts by weight of a curing accelerator; and a wet solution blend of 100 parts by weight of a silyl group containing vinyl type resin having a backbone substantially comprising a polyvinyl type polymer chain and containing at least one silicon atom attached to a hydrolyzable group at a terminal or in a side chain in its molecule; and 0.5 to 100 parts by weight of a metal powder, and one or more of the following: 0.01 to 100 parts by weight acrylic resin, 0.1 to 100 parts by weight cellulosic compound, and 0.01 to 50 parts by weight of reactive silicon compound, wherein said metal powder is suspended in said wet solution blend.

11. The paint of claim 10, wherein said metal powder is used in an amount of from 1 to 50 parts by weight, said acrylic resin is used in an amount of from 0.1 to 80 parts by weight, said cellulosic compound is used in an amount of from 0.1 to 80 parts by weight, and said reactive silicon compound is used in an amount of from 0.1 to 30 parts by weight.

* * * * *